United States Patent [19]

Bartholomew

[11] Patent Number: 4,979,765
[45] Date of Patent: Dec. 25, 1990

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 403,698

[22] Filed: Sep. 6, 1989

Related U.S. Application Data

[63] Continuation of Ser. No. 99,654, Sep. 21, 1987, abandoned, which is a continuation of Ser. No. 776,642, Sep. 16, 1985, abandoned, which is a continuation-in-part of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.⁵ ............................................. F16L 35/00
[52] U.S. Cl. ..................................... 285/93; 285/308; 285/319
[58] Field of Search ................. 285/93, 308, 319, 320, 285/921

[56] References Cited

U.S. PATENT DOCUMENTS

| | | |
|---|---|---|
| 1,542,421 | 6/1925 | Strongson . |
| 2,123,889 | 7/1938 | Gleason . |
| 2,635,901 | 4/1953 | Osborn . |
| 2,935,338 | 5/1960 | Mills, Jr. . |
| 3,139,293 | 6/1964 | Franck . |
| 3,314,696 | 4/1967 | Ferguson et al. . |
| 3,405,957 | 10/1968 | Chakroff . |
| 3,450,424 | 6/1969 | Calisher . |
| 3,453,005 | 7/1969 | Foults . |
| 3,534,988 | 10/1970 | Lindsey . |
| 3,538,940 | 11/1970 | Graham . |
| 3,569,903 | 3/1971 | Brishka . |
| 3,574,359 | 4/1971 | Klein . |
| 3,584,902 | 6/1971 | Vyne . |
| 3,650,549 | 3/1972 | Pepper . |
| 3,698,742 | 10/1972 | Jones et al. . |
| 3,711,125 | 1/1973 | Dehar . |
| 3,718,350 | 2/1973 | Klein . |
| 3,724,882 | 4/1973 | Dehar . |
| 3,826,523 | 7/1974 | Eschbaugh . |
| 3,929,356 | 12/1975 | DeVincent et al. . |
| 3,929,357 | 12/1975 | DeVincent et al. . |
| 3,980,324 | 9/1976 | Bouteille et al. . |
| 4,005,883 | 2/1977 | Guest . |
| 4,009,896 | 3/1977 | Brewer . |

(List continued on next page.)

FOREIGN PATENT DOCUMENTS 2307154 8/1974 Fed. Rep. of Germany .

OTHER PUBLICATIONS

IBM Technical Disclosure Bulletin, "Keying Device for Quick Disconnect Coupling", vol. 17, No. 7, Dec. 1974, p. 1948.

Primary Examiner—Dave W. Arola
Attorney, Agent, or Firm—Harness, Dickey & Peirce

[57] ABSTRACT

A swivelable quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable potions which are adapted to snap over the locking wall upon insertion of the conduit into the housing bore. Also, a safety sleeve is disclosed comprising a body, a tab on the body for indicating whether or not the conduit has been detached from the housing, and a window in the body for indicating whether or not the conduit is properly secured in the housing. Further, a retainer element is disclosed comprising a collar, an orientation means on the collar and at least one or more deflectable bent configuration legs projecting from the collar for retaining the conduit in the retainer element and in the housing.

8 Claims, 2 Drawing Sheets

U.S. PATENT DOCUMENTS

| | | |
|---|---|---|
| 4,021,062 | 5/1977 | Mariaulle . |
| 4,059,288 | 11/1977 | Mohr . |
| 4,080,752 | 3/1978 | Burge . |
| 4,111,464 | 9/1978 | Asano et al. . |
| 4,123,089 | 10/1978 | Viero et al. . |
| 4,123,090 | 10/1978 | Kotsakis et al. . |
| 4,123,091 | 10/1978 | Cosentino et al. . |
| 4,128,264 | 12/1978 | Oldford . |
| 4,135,745 | 1/1979 | Dehar . |
| 4,214,586 | 7/1980 | Mericle . |
| 4,266,814 | 5/1981 | Gallagher . |
| 4,305,606 | 12/1981 | Legris . |
| 4,423,892 | 1/1984 | Bartholomew . |
| 4,500,117 | 2/1985 | Ayers et al. . |
| 4,524,995 | 6/1985 | Bartholomew . |
| 4,526,411 | 7/1985 | Bartholomew . |
| 4,601,497 | 7/1986 | Bartholomew . |

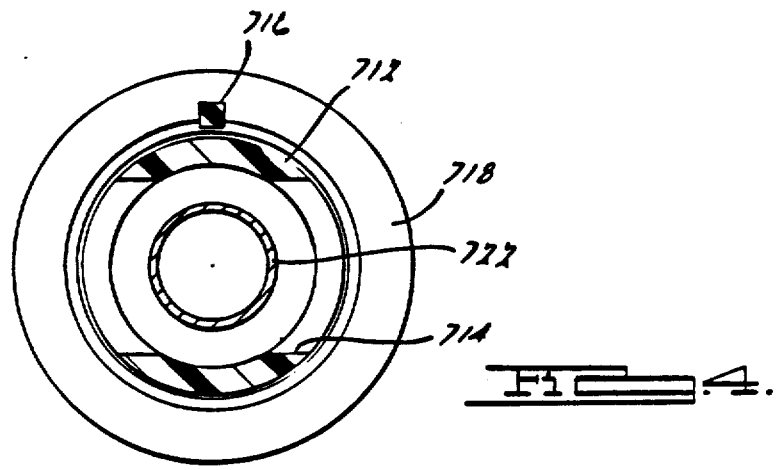
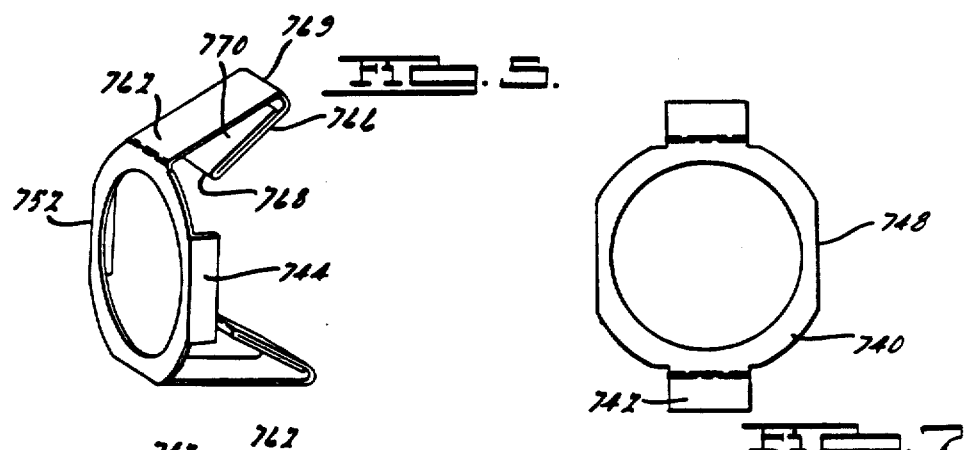
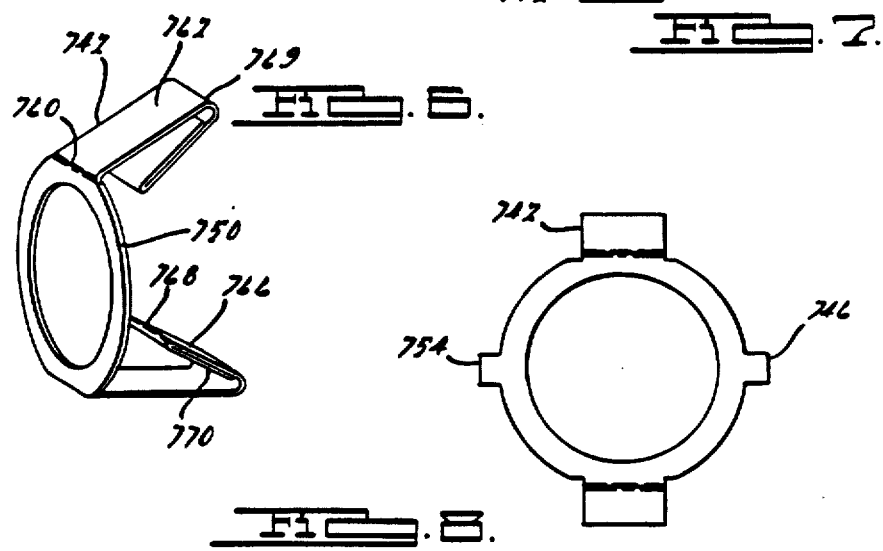

4,979,765

SWIVELABLE QUICK CONNECTOR ASSEMBLY

CROSS REFERENCE TO A RELATED APPLICATION

This application is a continuation of application Ser. No. 07/099,654, filed Sept. 21, 1987, entitled SWIVELABLE QUICK CONNECTOR ASSEMBLY, now abandoned which is a continuation of 06/776,642, filed Sept. 16, 1985, now abandoned which is a continuation in part of 06/360,201, filed Mar. 22, 1982, now U.S. Pat. No. 4,601,447 which is a continuation in part of 06/201,711, filed Oct. 29, 1980. now U.S. Pat. No. 4,423,892.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assembly components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is also an object of the present invention to provide an improved retainer element which operates to both secure the conduit in the axial bore or the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposal a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof.

Additional objects and advantages of the present invention will become apparent from reading of the detailed description of the preferred embodiments which make reference to the following set of drawings in which:

BRIEF DESCRIPTION OF THE DRAWINGS

FIG. 4 is a cross-sectional view of the safety sleeve along line 4-4.

FIG. 5 is a perspective view of another embodiment of a retainer element.

FIG. 6 is a perspective view of another embodiment of a retainer element.

FIG. 7 is an elevation view of another embodiment of a retainer element.

FIG. 8 is an elevation view of another embodiment of a retainer element.

DETAILED DESCRIPTION OF THE PREFERRED EMBODIMENTS

Referring to FIGS. 1, 2, 3, and 4, a cross-sectional, a second cross-sectional, a perspective view and a cross-sectional view of a safety sleeve 710 is shown. In the embodiment illustrated, the safety sleeve 710 is preferably manufactured from a plastic material. The safety sleeve 710 includes a body 712, at least one or more windows 714, and at least one or more tabs 716.

Figure 3:
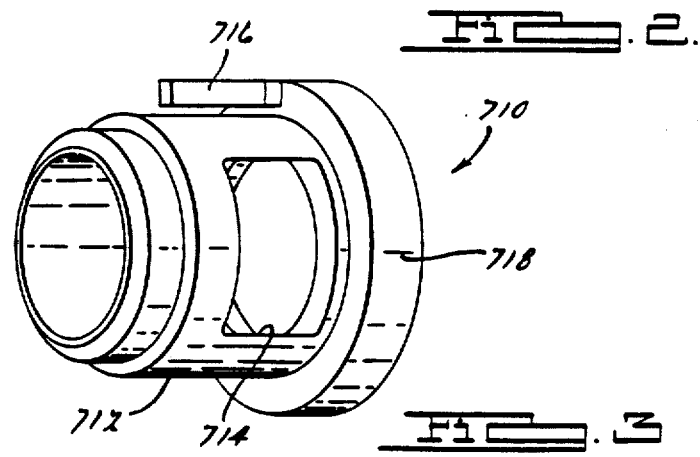
FIG. 3 is a perspective view of the safety sleeve made in accordance with the present invention.

The body 712, best seen in FIG. 3, has an incrementally increasing exterior surface, preferably at least one or more concentric collar portions. The body 712 has a flange 718 adjacent the larger end of the incrementally increasing exterior surface which prohibits the body 712 from completely inserting into the housing 720.

Figure 1:
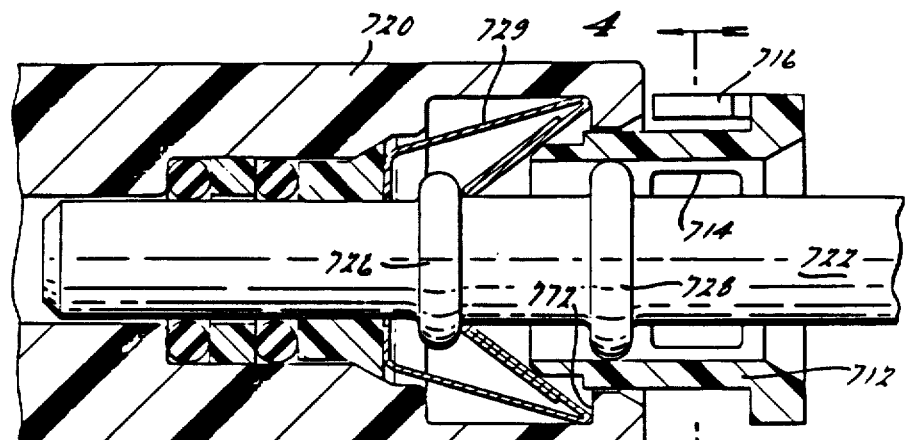
FIG. 1 is a side elevation view, view partially in cross-section, of a safety sleeve made in accordance with the present invention.
Figure 2:
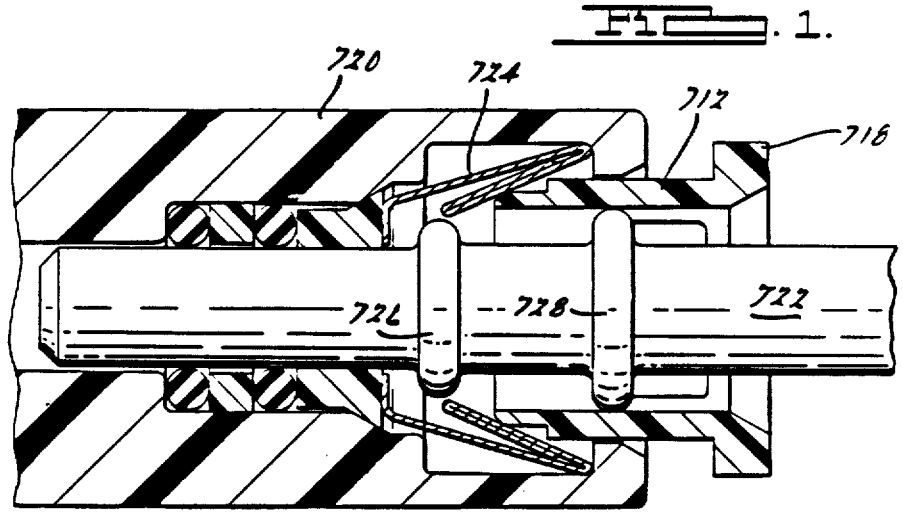
FIG. 2 is a side elevation view, partially in cross-section, of the safety sleeve of FIG. 1 with the tab means detached.

A conduit 722 with the safety sleeve 710 positioned thereon is retained in the housing 720 by a retainer element 724. The retainer element 724 is secured within the housing 720. The retainer element 724 biases on the conduit flange 726, securing the conduit 722 in the retainer element 724, as best seen in FIG. 1. A second conduit flange 728 is positioned within the safety sleeve 710. The windows 714, positioned in the body 712, enable a viewer to determine if the conduit 722 is positioned and secured properly by the retainer element 724 in the housing 720.

The tab 716 is preferably positioned on the body flange 718 and is detachably secured thereto. The tab 716 projects from the flange 718 in a direction above the body 712. The tab 716 enables the viewer to visably determine whether or not the conduit 722 has been removed from the housing 720. Also, the tab 716 enables the conduit 722 to be removed from the housing 720 for maintenance or repair. To remove the conduit 722 from the housing 720, the tab 716 is broken off, for example, at the necked-down portion formed at the base of the tab 716, as in FIG. 2, thereby permitting the safety sleeve 710 to be inserted into the housing which, in turn, expands the retainer element 724, releasing the conduit flange 726 enabling the conduit 722 to be removed from the housing 720. When the conduit 722 is reassembled in the housing 720, the removed tab 716 of the safety sleeve 710 provides a visual indicator that the conduit 722 may have been previously removed. If desired, a new safety sleeve 710 may be replaced on the conduit 722.

Referring to FIGS. 5, 6, 7 and 8 a perspective, a second perspective, a front elevation, and a second front elevation view of the retainer element 724 is shown. The retainer element 724 manufactured from a molded plastic or metallic material, depending upon the particular application thereof. Also, the retainer has non-removable characteristics; however, if desired, a tool may be inserted into the housing 720 which will remove the retainer element 724 from the housing 720. The retainer element 724, preferably a one-piece construction, includes a collar 740 and at least one or more deflectable bent configuration legs 742.

The collar 740 may have flanges 744, tabs 746, flats 748 or rounds 750 between the legs 742. All of the elements mentioned, which will be described herein, provide a means for rotationally orientating the retainer element 724 relative to the housing 720 preparatory to assembly of the element 724 therewith. The collar 740 has an aperture 741 for providing passage of the conduit 722 through the retainer element 724. More specifically, the flanges 744, tabs 746, etc. are intended to facilitate rotational orientation of the retainer element 724 with respect to the associated housing, when housing such as those seen in FIGS. 34 and 35 of U.S. Pat. No. 4,601,497 are used, so that the locking or retaining legs 742 (hereinafter described) are positively rotationally oriented with respect to the correlative windows or apertures 534 in the associated housing, as seen in FIG. 34 and 35 of U.S. Pat. No. 4,601,497 whereby to obviate the possibility of the legs 742 not lockingly engaging the rearward edges of the windows or apertures 534, which nonengagement (and the consequential non-securing of the conduit 722 within the housing 720) might occur in the event the legs 742 were not properly rotationally aligned therewith.

The flanges 744, best seen in FIG. 5, project from the collar 740, forming straight edges 752 along the collar 740. The housing 720, when this type of retainer element is used, has a pair of flat surface walls for complementing the flat edges 752 of the retainer element 724. The flat housing walls enable the retainer element 724 to be positioned in a proper orientation in the housing 720. Thus, the flat edge-flat wall configuration eliminates the chance of improper positioning of the retainer element 724 in the housing 720.

The tabs 746, preferably having an overall rectangular configuration, as best seen in FIG. 8, project from the collar 740. The housing 720, when this type of retainer element is used, has a pair of substantially rectangular grooves in the surface walls of the housing for complementing the tabs 746. The grooves enable the retainer element 724 to be positioned in a proper orientation in the housing 720. Thus, this tab-groove configuration eliminates the chance of improper positioning of the retainer element 724 in the housing 720.

The collar 740 may have flats 748, as best seen in FIG. 7. The housing 720, when this type of retainer element is used, has a pair of flat surface walls for complementing the flats 748 of the retainer element 724. The flat housing walls enable the retainer element 724 to be positioned in a proper orientation in the housing 720. Thus, this flats-flat wall configuration eliminates the chance of improper positioning of the retainer element 724 in the housing 720.

The collar 740 may have rounds 750, best seen in FIG. 6. When this is the case, the projecting legs 742 from flat edges 760. Thus, the housing 720, when this type of retainer is used, has a pair of flat surface walls for complementing the flat edges 760 of the retainer element 724. The flat housing walls enable the retainer element 724 to be positioned in a proper orientation in the housing 720. Thus, this flat edge-flat wall configuration eliminates the chance of improper positioning of the retainer element 724 in the housing 720.

The legs 742 have a first portion 762, a first retaining bend 764, a first retaining portion 766, a second retaining bend 768 and a second retaining portion 770. The first portion 762 of the legs 742 project from the collar 740. The first portion 762 bends forming the first retaining bend 768. The first retaining bend 764 secures the retainer element 724 on a housing flange 772 in the housing 720. The first retaining bend 764 bends forming the first retaining portion 766. The second retaining bend 768 is formed at the bend of the first and second retaining portions 766 and 770. The second retaining bend 768 abuts against the conduit flange 726 securing the conduit 722 in the retainer element 724. The second retaining portion 770 doubles back on the first retaining portion 766 for enhancing retaining force characteristics of the retaining element 724. The legs 742 are bent in accordance with conventional sheet metal practices.

While the above description constitutes the preferred embodiments of the present invention, it will be appreciated that the invention is susceptible to modification, variation and change without departing from the proper scope and fair meaning of the accompanying claims.

What is claimed is:

1. A safety sleeve for enabling a user to visually determine if a conduit has been removed from its connector and, also, to enable the user to visually determine whether or not the conduit is properly inserted into the connector, the conduit formed with at least one annular projection, the connector including a housing formed with an axial bore for receiving the conduit at a first end and for providing a fluid path at a second end, and a retainer element disposed within the axial bore of the housing and having at least one deformable portion for operatively cooperating with the conduit and the housing and preventing withdrawal of the conduit from the housing, said safety sleeve comprising:

a body member adapted to be disposed about the conduit and adapted to be inserted into the housing to expand the retainer element to enable the conduit to be removed from the housing;

tab means on said body member for indicating whether or not the conduit may have been removed from the connector, said tab means removably secured to and extending above said body member to prevent said body member from being inserted into the housing and when said tab means is removed from said body member to allow the said body member to be inserted into the housing to expand the retainer element to enable the conduit to be removed from the connector and indicate that the conduit may have been removed from the connector; and window means in said body member for enabling visual inspection of the annular projection of the conduit through said window means to determine proper securement of the conduit with the connector.

2. The safety sleeve according to claim 1 wherein said body has a flange for prohibiting total insertion of said safety sleeve into said connector.

3. The safety sleeve according to claim 2 wherein said tab means is positioned on said flange.

4. The safety sleeve according to claim 3 wherein said body has a concentric collar exterior surface configuration.

5. The safety sleeve according to claim 4 wherein said window means is positioned in a concentric collar adjacent to said flange.

6. In combination with a connector assembly comprising:

a tubular conduit adapted to convey fluid and formed with at least one annular projection;

a housing formed with an axial bore for receiving the conduit at a first end and for providing a fluid path at a second end;

a retainer element including at least one deformable portion for operatively cooperating with the annular projection of the conduit and a radially extending surface of the housing and thereby maintaining the retainer element within the axial bore and preventing withdrawal of the conduit from the housing;

the improvement comprising:

a safety sleeve having a body adapted to be disposed about the conduit and movable relative to the conduit and insertable into the housing to expand the retainer element to enable the conduit to be removed from the housing;

said body having a cylindrical shape with a flange extending radially outwardly from one end of said body; and said body having means forming at least one window adjacent said flange to enable a viewer to visually determine the location of the annular projection of the conduit relative to said body to determine if the conduit is positioned and secured properly by the retainer element in the housing.

7. In combination with a connector assembly comprising:

a tubular conduit adapted to convey fluid and formed with at least one annular projection;

a housing formed with an axial bore for receiving the conduit at a first end and for providing a fluid path at a second end;

a retainer element including at least one deformable portion for operatively cooperating with the annular projection of the conduit and a radially extending surface of the housing and thereby maintaining the retainer element within the axial bore and preventing withdrawal of the conduit from the housing;

the improvement comprising;

a safety sleeve having a body adapted to be disposed about the conduit and movable relative to the conduit and insertable into the housing to expand the retainer element to enable the conduit to be removed from the housing;

said body having a cylindrical shape with a flange extending radially outwardly from one end of said body;

at least one tab being detachably secured to said flange and extending axially toward another end of said body and being spaced radially from said body to prevent said body from being inserted into the housing; and said tab being detached from said flange to permit said body to be inserted into the housing to expand the retainer element and release the annular projection thereby enabling the conduit to be removed from the housing and indicating that the conduit may have been removed from the housing when said tab is detached from said flange.

8. A safety sleeve for enabling a user to visually determine if a conduit may have been removed from its connector and, also, to enable the user to visually determine whether or not the conduit is properly inserted into the connector, the conduit formed with at least one annular projection, the connector including a housing formed with an axial bore for receiving the conduit at a first end and for providing a fluid path at a second end, and a retainer element disposed within the axial bore of the housing and having at least one deformable portion for operatively cooperating with the conduit and the housing and preventing withdrawal of the conduit from the housing, said safety sleeve comprising:

a body member adapted to be disposed about the conduit and adapted to be inserted into the housing to expand the retainer element to enable the conduit to be removed from the housing; and tab means on said body member for indicating whether or not said conduit may have been removed from the connector, said tab means removably secured to and extending above said body member to prevent said body member from being inserted into the housing and when said tab means is removed from said body member to allow the said body member to be inserted into the housing to enable the conduit to be removed from the connector and indicate that the conduit may have been removed from the connector.

* * * * *

UNITED STATES PATENT AND TRADEMARK OFFICE
CERTIFICATE OF CORRECTION

PATENT NO. : 4,979,765

DATED : Dec. 25, 1990

INVENTOR(S) : Donald D. Bartholomew

It is certified that error appears in the above-identified patent and that said Letters Patent is hereby corrected as shown below:

ON THE TITLE PAGE, Abstract, Line 13, "potions" should be --portions--;

Col. 1, Line 12, "4,601,447" should be --4,601,497--;

Col. 1, Line 22, "assembly" should be --assemble--;

Col. 1, Line 24, delete "a" after --as--;

Col. 2, Line 26, delete "view" (second occurrence);

Col. 3, Line 6, "visably" should be --visibly--;

Col. 3, Line 26, after "724" insert --is--;

Col. 3, Line 51, "Figure" should be --Figures--;

Col. 4, Line 12, after "7" insert --.--;

UNITED STATES PATENT AND TRADEMARK OFFICE
CERTIFICATE OF CORRECTION

PATENT NO. : 4,979,765

DATED : December 25, 1990

INVENTOR(S) : Donald D. Bartholomew

It is certified that error appears in the above-identified patent and that said Letters Patent is hereby corrected as shown below:

Column 4, line 22, "from" should be --form--.

Signed and Sealed this

Twenty-ninth Day of September, 1992

Attest:

DOUGLAS B. COMER

Attesting Officer

Acting Commissioner of Patents and Trademarks